(12) United States Patent
Sadahiro

(10) Patent No.: US 10,955,042 B2
(45) Date of Patent: Mar. 23, 2021

(54) VEHICLE DIFFERENTIAL DEVICE

(71) Applicant: TOYOTA JIDOSHA KABUSHIKI KAISHA, Toyota (JP)

(72) Inventor: Shingo Sadahiro, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/515,408

(22) Filed: Jul. 18, 2019

(65) Prior Publication Data

US 2020/0025284 A1    Jan. 23, 2020

(30) Foreign Application Priority Data

Jul. 18, 2018    (JP) .............................. JP2018-135386

(51) Int. Cl.
| | | |
|---|---|---|
| *F16H 57/04* | (2010.01) | |
| *F16H 48/285* | (2012.01) | |
| *F16H 48/40* | (2012.01) | |
| *F16H 48/08* | (2006.01) | |

(52) U.S. Cl.
CPC .......... *F16H 57/043* (2013.01); *F16H 48/08* (2013.01); *F16H 48/285* (2013.01); *F16H 48/40* (2013.01)

(58) Field of Classification Search
CPC ............... F16H 57/043; F16H 57/0421; F16H 57/0424; F16H 57/0479; F16H 57/0493; F16H 57/04; F16H 48/08; F16H 48/285; F16H 48/40
See application file for complete search history.

(56) References Cited

U.S. PATENT DOCUMENTS 3,040,600 A * 6/1962 Mueller .................. F16H 48/08
475/88

FOREIGN PATENT DOCUMENTS

JP    2009-127706 A    6/2009

* cited by examiner

*Primary Examiner* — Huan Le
(74) *Attorney, Agent, or Firm* — Oliff PLC

(57) ABSTRACT

A vehicle differential device comprises: a differential casing rotatably disposed around a rotational axis; and a pair of side gears rotatably supported by the differential casing and supported in a thrust direction via an annular bearing surface formed in the differential casing to mesh with a pair of pinion gears. The differential casing is provided with a first lubricating oil passage formed in a circumferential direction on an outer circumferential side of the bearing surface in the differential casing, and a first guidance projection projected toward the rotational axis in the first lubricating oil passage and guiding a lubricating oil flowing in a circumferential direction in the first lubricating oil passage due to rotation of the differential casing around the rotational axis, toward a first meshing portion between a first side gear of the pair of side gears and the pinion gears.

7 Claims, 14 Drawing Sheets

VEHICLE DIFFERENTIAL DEVICE

This application claims priority from Japanese Patent Application No. 2018-135386 filed on Jul. 18, 2018, the disclosure of which is herein incorporated by reference in its entirety.

FIELD OF THE INVENTION

The present invention relates to a vehicle differential device including a pair of side gears rotatably supported by a differential casing and meshed with a pair of pinion gears and relates to a technique of suitably suppressing seizure in a meshing portion between the side gears and the pinion gears.

DESCRIPTION OF THE RELATED ART

There is known a vehicle differential device including (a) a differential casing rotatably disposed around a rotational axis, and (b) a pair of side gears rotatably supported by the differential casing and supported in a thrust direction via an annular bearing surface to mesh with a pair of pinion gears. For example, this corresponds to a vehicle differential device described in Patent Document 1. The vehicle differential device of Patent Document 1 is a shaftless vehicle differential device having a pinion gear supporting portion projected from the differential casing for rotatably supporting the pinion gears instead of a pinion shaft in the differential casing.

PRIOR ART DOCUMENT

Patent Document

Patent Document 1: Japanese Laid-Open Patent Publication No. 2009-127706

SUMMARY OF THE INVENTION

Technical Problem

In a vehicle including a shaftless vehicle differential device as disclosed in Patent Document 1 or a vehicle differential device having a pinion shaft, for example, to improve fuel consumption, it is conceivable that a lubricating oil stored in a casing which houses the vehicle differential device is reduced in amount to reduce resistance to stirring when a gear of the vehicle differential device stirs the lubricating oil; however, this may cause seizure in a meshing portion between the side gears and the pinion gears since lubrication in the differential casing tends to be insufficient due to the reduction in amount of the lubricating oil.

The present invention was conceived in view of the situations and it is therefore an object of the present invention to provide a vehicle differential device suitably suppressing seizure in the meshing portion between the side gears and the pinion gears.

Solution to Problem

To achieve the above object, a first aspect of the present invention provides a vehicle differential device comprising: (a) a differential casing rotatably disposed around a rotational axis; and a pair of side gears rotatably supported by the differential casing and supported in a thrust direction via an annular bearing surface formed in the differential casing to mesh with a pair of pinion gears, wherein (b) the differential casing is provided with a first lubricating oil passage formed in a circumferential direction on an outer circumferential side of the bearing surface in the differential casing, and (c) a first guidance projection projected toward the rotational axis in the first lubricating oil passage and guiding a lubricating oil flowing in a circumferential direction in the first lubricating oil passage due to rotation of the differential casing around the rotational axis, toward a first meshing portion between a first side gear of the pair of side gears and the pinion gears.

Advantageous Effects of Invention

According to the differential device recited in the first aspect of the invention, the differential casing is provided with the first lubricating oil passage, and the first guidance projections. Therefore, the lubricating oil flowing in the circumferential direction in the first lubricating oil passage due to the rotation of the differential casing around the rotational axis is guided by the first guidance projections toward the meshing portion, and the meshing portion is suitably lubricated by the guided lubricating oil, so that seizure is suitably suppressed in the meshing portion.

DESCRIPTION OF EMBODIMENTS

Figure 1:
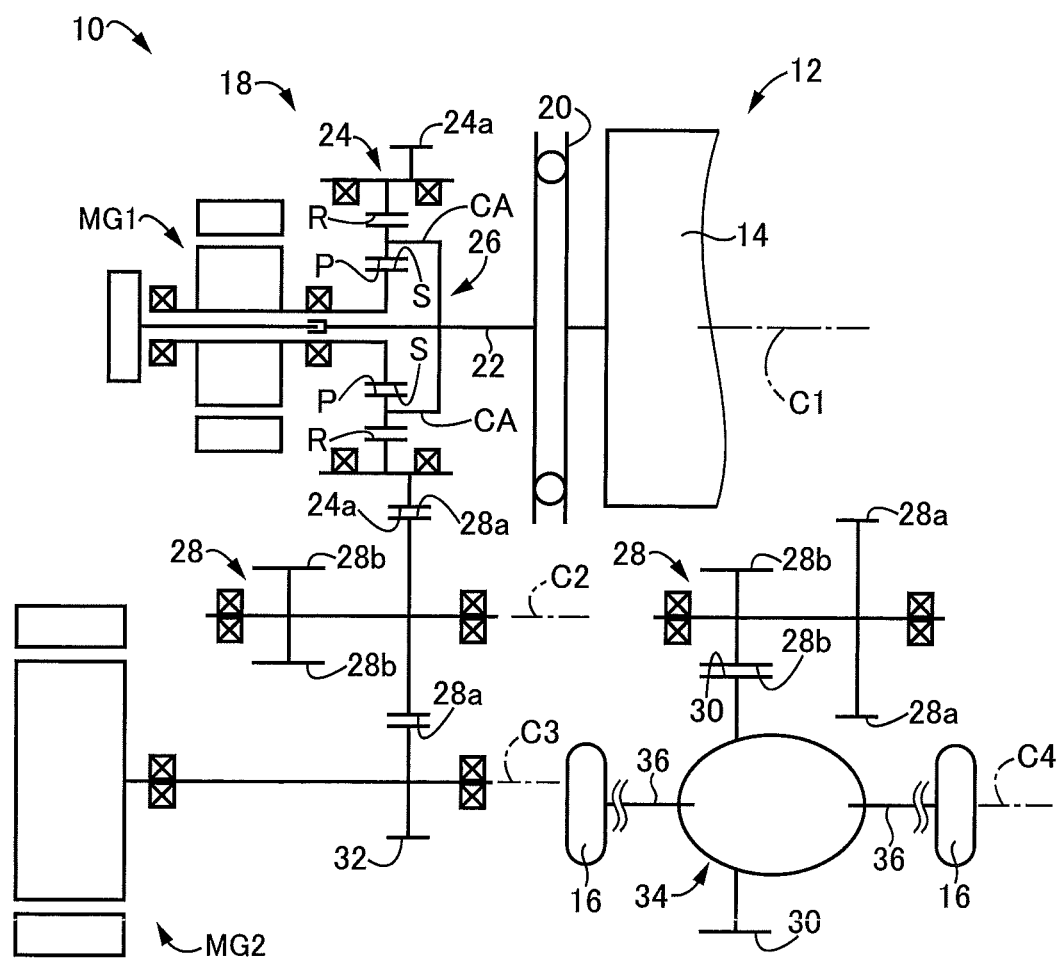
FIG. 1 is a diagram for explaining a schematic configuration of a drive device of a hybrid vehicle to which the present invention is applied.

A second aspect of the present invention provides the vehicle differential device recited in the first aspect of the invention, wherein (a) the differential casing includes a wall portion facing a back surface of the first side gear, and wherein (b) the first guidance projection projects from a bottom wall surface in the first lubricating oil passage and a side wall surface on the wall portion side in a direction toward the first meshing portion between the first side gear and the pinion gears. Therefore, the lubricating oil flowing in the circumferential direction in the first lubricating oil passage due to the rotation of the differential casing around the rotational axis is suitably guided by the first guidance projections to the meshing portion.

A third aspect of the present invention provides the vehicle differential device recited in the first or second aspect of the invention, wherein a tip portion of the first guidance projection projects toward the rotational axis further than a circular locus along which a position on the outermost circumferential side and closest to the first side gear of a tooth bottom of the pinion gear is rotated around the rotational axis. Therefore, the lubricating oil flowing in the circumferential direction in the first lubricating oil passage due to the rotation of the differential casing around the rotational axis is suitably guided by the first guidance projections to the meshing portion.

A fourth aspect of the present invention provides the vehicle differential device recited in any one of the first to third aspects of the invention, wherein (a) the differential casing includes a pinion shaft rotatably supporting the pair of pinion gears, and wherein (b) a tip portion of the first guidance projection is formed at a position shifted from an axis of the pinion shaft in the first lubricating oil passage. Therefore, the lubricating oil flowing in the circumferential direction in the first lubricating oil passage due to the rotation of the differential casing around the rotational axis is suitably guided by the first guidance projections to the meshing portion.

A fifth aspect of the present invention provides the vehicle differential device recited in the fourth aspect of the invention, wherein a pair of projections are disposed on the axis of the pinion shaft as the first guidance projection. Therefore, a first meshing portion of meshing between one of the pinion gears and one of the side gears and a second meshing portion of meshing between the other of the pinion gears and the one of the side gears can suitably be lubricated.

A sixth aspect of the present invention provides the vehicle differential device recited in any one of the first to fifth aspects of the invention, wherein the differential casing is provided with a second lubricating oil passage formed in the same manner as the first lubricating oil passage on the side opposite to the first lubricating oil passage with respect to the pair of pinion gears, and a second guidance projection guiding a lubricating oil flowing in the second lubricating oil passage due to rotation of the differential casing around the rotational axis toward a second meshing portion between a second side gear of the pair of side gears and the pinion gears. Therefore, the lubricating oil flowing in the second lubricating oil passage in the circumferential direction due to the rotation of the differential casing around the rotational axis is guided by the second guidance projection toward the second meshing portion between the second side gear and the pinion gear, the meshing portion between the other side gear and the pinion gear is suitably lubricated.

Examples of the present invention will now be described in detail with reference to the drawings. In the following examples, the figures are simplified or deformed as needed and portions are not necessarily precisely drawn in terms of dimension ratio, shape, etc.

First Example

FIG. 1 is a diagram for explaining a schematic configuration of a drive device 12 of a hybrid vehicle (hereinafter referred to as a vehicle) 10 to which the present invention is applied. In FIG. 1, the drive device 12 includes an engine 14 as a drive power source, and a transaxle 18 that is a power transmission device transmitting a power of the engine 14 to drive wheels 16.

As shown in FIG. 1, the transaxle 18 includes a planetary gear type power distribution mechanism 26 distributing the power output from the engine 14 to a first electric motor MG1 and a cylindrical output gear shaft 24 via a damper 20 and an input shaft 22 which are rotatable around a first rotational axis C1, a counter gear mechanism 28 that has a counter driven gear 28a meshed with a counter drive gear 24a formed on the output gear shaft 24 and a differential drive gear 28b meshed with a differential ring gear 30 and that is rotatable around a second rotational axis C2 parallel to the first rotational axis C1, a second electric motor MG2 that has an output gear 32 meshed with the counter driven gear 28a of the counter gear mechanism 28 and that is rotatable around a third rotational axis C3 parallel to the first rotational axis C1, a differential device (vehicle differential device) 34 that has the differential ring gear 30 meshed with the differential drive gear 28b of the counter gear mechanism 28 and that is rotatable around a fourth rotational axis (rotational axis) C4 parallel to the first rotational axis C1, and drive shafts 36 rotating together with the drive wheels 16. The power distribution mechanism 26 includes a sun gear S rotatable around the first rotational axis C1, a ring gear R disposed on the outer circumferential side of the sun gear S, and a carrier CA supporting a pinion gear P meshed with the sun gear S and the ring gear R in a rotatable and revolvable manner. The sun gear S is coupled to the first electric motor MG1 in a power transmittable manner, the carrier CA is coupled to the input shaft 22 in a power transmittable manner, and the ring gear R is integrally formed on an inner circumference of the cylindrical output gear shaft 24.

In the transaxle 18 configured as described above, the power of the engine 14 is input via the damper 20 and the input shaft 22 and transmitted to the cylindrical output gear shaft 24 and is transmitted from the output gear shaft 24 sequentially through the counter gear mechanism 28, the differential device 34, a pair of the drive shafts 36, etc. to the drive wheels 16, while a power of a second electric motor MG2 is transmitted sequentially through the counter gear mechanism 28, the differential device 34, the pair of the drive shafts 36, etc. to the drive wheels 16.

Figure 2:
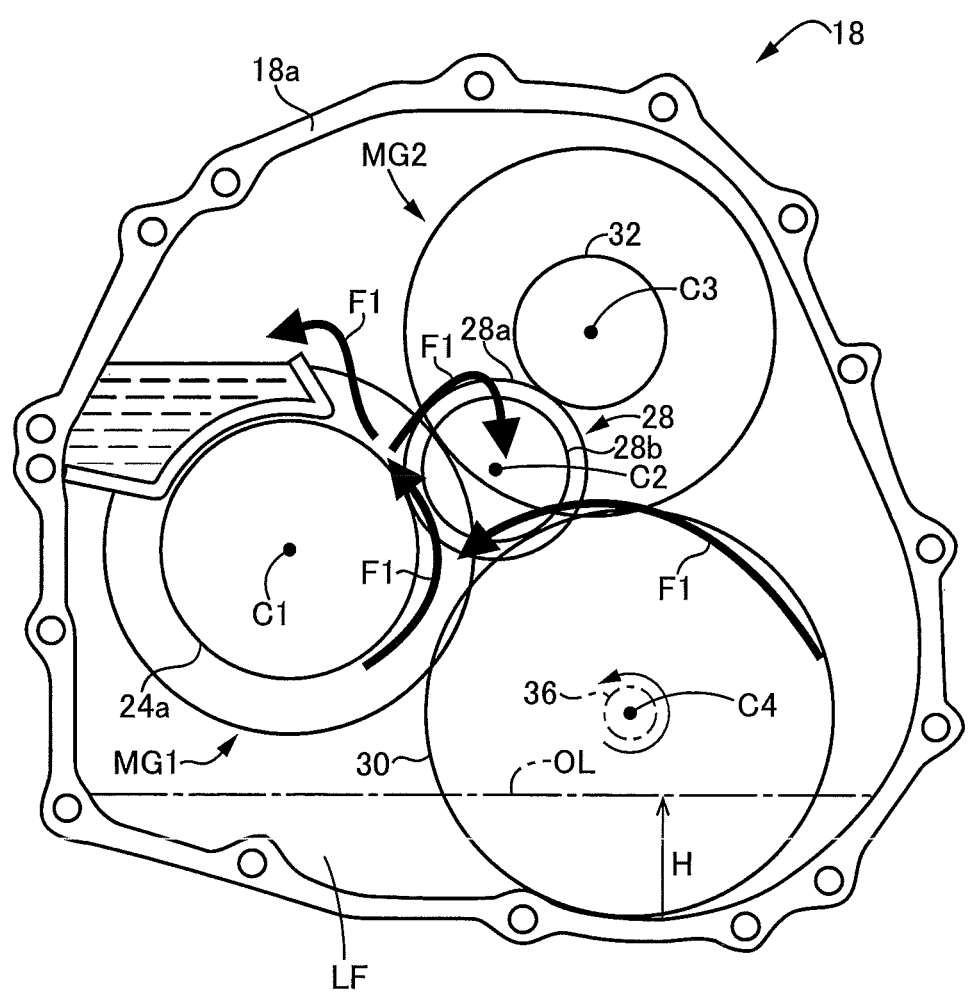
FIG. 2 is a view for schematically explaining the inside of a case of a transaxle disposed in the drive device of FIG. 1.

FIG. 2 is a view for schematically explaining the inside of a casing of the transaxle 18 disposed in the drive device 12 of FIG. 1. As shown in FIG. 2, the transaxle 18 includes, for example, a container-shaped transaxle casing 18a housing the first electric motor MG1, the second electric motor MG2, the power distribution mechanism 26, the differential device 34, etc. An oil level OL indicated by a dashed-dotted line in FIG. 2 indicates an oil level of an oil (lubricating oil) LF stored in a bottom portion of the transaxle casing 18a, and arrows F1 shown in FIG. 2 indicate a flow of the oil LF scooped up (splashed up) by the differential ring gear 30 of the differential device 34.

Figure 3:
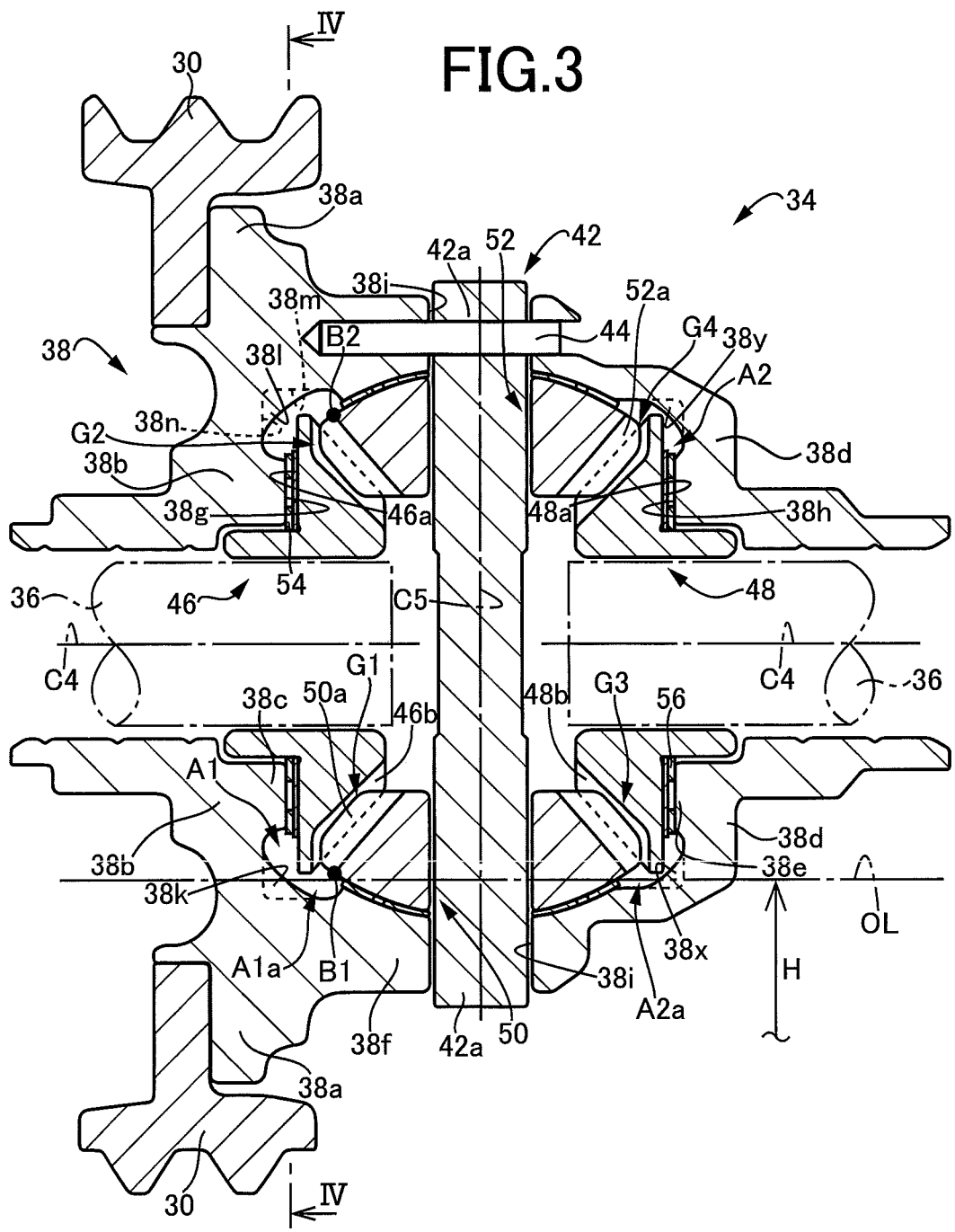
FIG. 3 is a cross-sectional view for explaining a configuration of a differential device disposed in the transaxle of FIG. 2.

FIG. 3 is a cross-sectional view for explaining a configuration of the differential device 34 disposed in the transaxle 18 of FIG. 2. As shown in FIG. 3, the differential device 34 includes: a container-shaped differential casing 38 rotatably supported around the fourth rotational axis C4 by, for example, the transaxle casing 18a; the differential ring gear 30 fixed to an outer circumferential portion 38a of the differential casing 38 by a plurality of fastening bolts 40 (see FIGS. 4 and 5); a shaft-shaped pinion shaft 42 supported at both end portions 42a thereof by the differential casing 38 and fixed to the differential casing 38 by a knock pin 44 such that the pinion shaft 42 is orthogonal to the fourth rotational axis C4 of the differential casing 38; a pair of first and second side gears 46, 48 rotatably supported by the differential casing 38 around the fourth rotational axis C4 in a state of facing each other across the pinion shaft 42 and housed in the differential casing 38; and a pair of pinion gears 50, 52 that rotates together with the differential casing 38 due to the pinion shaft 42 inserted therethrough such that the pinion gears 50, 52 are rotatably supported by the pinion shaft 42 and that is meshed with the pair of the side gears 46, 48.

As shown in FIG. 3, the differential casing 38 includes: a first wall portion (wall portion) 38b facing a back surface 46a of the first side gear 46 of the pair of the side gears 46, 48; a first projecting portion 38c projecting from the first wall portion 38b in an annular shape in a direction toward the back surface 46a of the first side gear 46; a second wall portion 38d facing a back surface 48a of the second side gear 48 of the pair of the side gears 46, 48; a second projecting portion 38e projecting from the second wall portion 38d in an annular shape in a direction toward the back surface 48a of the second side gear 48; and a coupling portion 38f coupling the first wall portion 38b and the second wall portion 38d. The first projecting portion 38c and the second projecting portion 38e which are formed on the differential casing 38 support the pair of the side gears 46, 48 in the differential casing 38 in a thrust direction, i.e., a fourth rotational axis C4 direction, via an annular first bearing surface (bearing surface) 38g formed on a leading end surface of the first projecting portion 38c and an annular second bearing surface (bearing surface) 38h formed on a leading end surface of the second projecting portion 38e. In the differential casing 38, an annular first washer 54 is interposed between the first bearing surface 38g of the first projecting portion 38c and the back surface 46a of the first side gear 46, and an annular second washer 56 is interposed between the second bearing surface 38h of the second projecting portion 38e and the back surface 48a of the second side gear 48. The coupling portion 38f of the differential casing 38 is provided with a pair of insertion holes 38i for inserting the pinion shaft 42, and through-holes 38j (see FIG. 5) through which components, for example, the side gears 46, 48, can be inserted into the differential casing 38 when the components are assembled into the differential casing 38.

Figure 4:
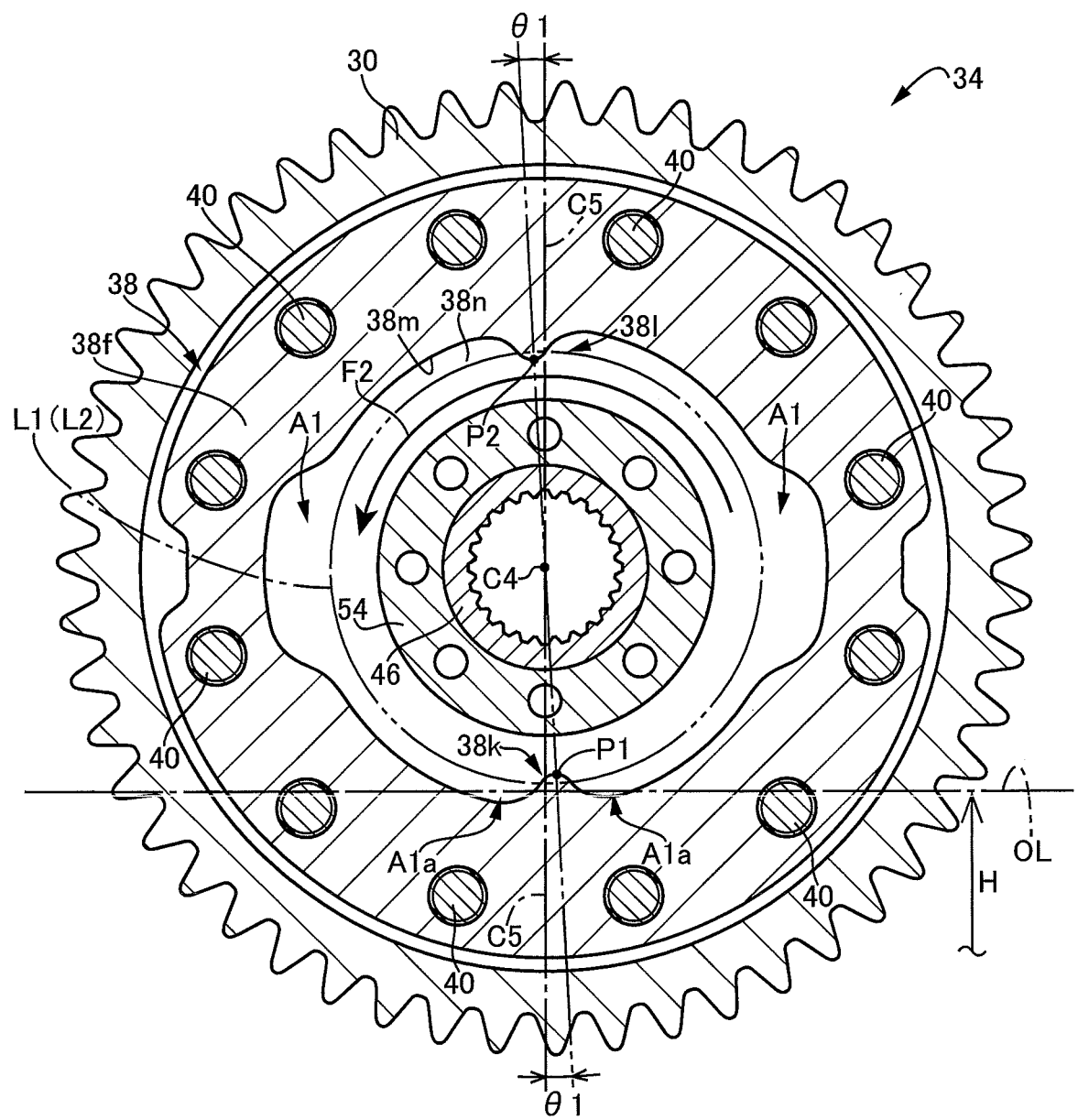
FIG. 4 is a cross-sectional view taken along a line IV-IV of FIG. 3.
Figure 5:
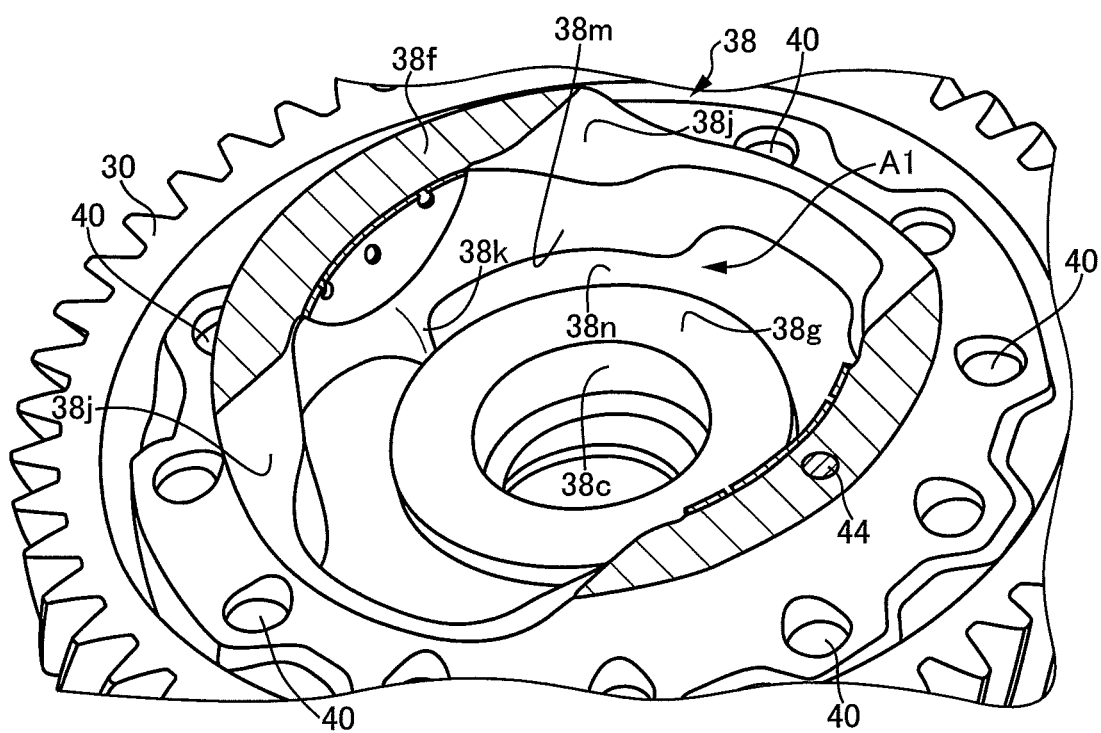
FIG. 5 is a perspective view for explaining the inside of a differential casing disposed in the differential device of FIG. 3.

FIG. 4 is a cross-sectional view taken along a line IV-IV of FIG. 3 and FIG. 5 is a perspective view for explaining the inside of the differential casing 38 disposed in the differential device 34 of FIG. 3. As shown in FIGS. 3 to 5, the differential casing 38 is provided with a groove-shaped first lubricating oil passage A1 formed in a circumferential direction to open inward on the outer circumferential side of the first bearing surface 38g. As shown in FIGS. 4 and 5, the first lubricating oil passage A1 is, for example, an annular space surrounded by the first wall portion 38b and the coupling portion 38f and disposed on the outer circumferential side relative to the first projecting portion 38c. As shown in FIG. 3, the differential casing 38 is provided with a groove-shaped second lubricating oil passage A2 formed in a circumferential direction to open inward on the outer circumferential side of the second bearing surface 38h. The second lubricating oil passage A2 is an annular space surrounded by the second wall portion 38d and the coupling portion 38f and disposed on the outer circumferential side relative to the second projecting portion 38e. Therefore, the second lubricating oil passage A2 is formed in the same manner as the first lubricating oil passage A1 on the side opposite to the first lubricating oil passage A1 with respect to the pair of the pinion gears 50, 52 in the differential casing 38.

As shown in FIGS. 3 and 4, a height H of the oil level OL of the oil LF is set such that, for example, a portion of the first lubricating oil passage A1 formed in the differential casing 38 is immersed in the oil LF to form an oil storage portion A1a in which the oil LF is stored in a portion of the first lubricating oil passage A1 and that a first meshing portion (meshing portion) G1 between the first side gear 46 and the pinion gear 50 and a second meshing portion (meshing portion) G2 between the first side gear 46 and the pinion gear 52 are not immersed in the oil LF, while the vehicle 10 is stopped, i.e., while the rotation of the differential casing 38 around the fourth rotational axis C4 is stopped. The height H of the oil level OL of the oil LF is also set such that a portion of the second lubricating oil passage A2 formed in the differential casing 38 is immersed in the oil LF to form an oil storage portion A2a in which the oil LF is stored in a portion of the second lubricating oil passage A2 and that a third meshing portion G3 between the second side gear 48 and the pinion gear 50 and a fourth meshing portion G4 between the second side gear 48 and the pinion gear 52 are not immersed in the oil LF, while the vehicle 10 is stopped. The first meshing portion G1 is a portion where teeth formed on a gear portion 46b of the first side gear 46 are meshed with teeth formed on a gear portion 50a of the pinion gear 50 between the first side gear 46 and the pinion gear 50. The second meshing portion G2 is a portion where the teeth formed on the gear portion 46b of the first side gear 46 are meshed with teeth formed on a gear portion 52a of the pinion gear 52 between the first side gear 46 and the pinion gear 52. The third meshing portion G3 is a portion where teeth formed on a gear portion 48b of the second side gear 48 are meshed with the teeth formed on the gear portion 50a of the pinion gear 50 between the second side gear 48 and the pinion gear 50. The fourth meshing portion G4 is a portion where the teeth formed on the gear portion 48b of the second side gear 48 are meshed with the teeth formed on the gear portion 52a of the pinion gear 52 between the second side gear 48 and the pinion gear 52.

In the first lubricating oil passage A1 and the second lubricating oil passage A2 configured as described above, when the differential casing 38 rotates around the fourth rotational axis C4, the rotation of the differential casing 38 around the fourth rotational axis C4 causes the oil LF stored in the oil storage portion A1a to flow in the circumferential direction inside the first lubricating oil passage A1 and causes the oil LF stored in the oil storage portion A2a to flow in the circumferential direction inside the second lubricating oil passage A2.

Additionally, as shown in FIGS. 3 and 4, the differential casing 38 is provided with a pair of first guidance projections 38k, 38l projected toward the fourth rotational axis C4 in the first lubricating oil passage A1. As shown in FIG. 3, the first guidance projection 38k projects in a direction toward the first meshing portion G1 from a bottom wall surface 38m forming the first lubricating oil passage A1 and a side wall surface 38n on the first wall portion 38b side forming the first lubricating oil passage A1. The first guidance projection 38l projects in a direction toward the second meshing portion G2 from the bottom wall surface 38m and the side wall surface 38n. The bottom wall surface 38m is an inner circumferential surface of the coupling portion 38f formed in the differential casing 38, and the side wall surface 38n is an inner wall surface of the first wall portion 38b formed in the differential casing 38.

As shown in FIG. 4, the paired first guidance projections 38k, 38l are both disposed to overlap on an axis C5 (see FIG. 3) of the pinion shaft 42 in the fourth rotational axis C4 direction, and the paired first guidance projections 38k, 38l are symmetric to each other about the fourth rotational axis C4 in the fourth rotational axis C4 direction. As shown in FIG. 4, a tip portion P1 of the first guidance projection 38k projects toward the fourth rotational axis C4 further than a circular locus L1 along which a position B1 (see FIG. 3) on the outermost circumferential side and closest to the first side gear 46 in the fourth rotational axis C4 direction of a tooth bottom of the pinion gear 50 is rotated around the fourth rotational axis C4. A tip portion P2 of the first guidance projection 38l projects toward the fourth rotational axis C4 further than a circular locus L2 along which a position B2 (see FIG. 3) on the outermost circumferential side and closest to the first side gear 46 in the fourth rotational axis C4 direction of a tooth bottom of the pinion gear 52 is rotated around the fourth rotational axis C4. The loci L1, L2 described above are indicated by dashed-two dotted lines in FIG. 4, and in this example, the loci L1 and L2 are the same locus.

As shown in FIG. 4, the tip portion P1 of the first guidance projection 38k is formed at a position shifted by a predetermined angle θ1 (degree) in a direction of rotation of the differential casing 38 at the time of forward running of the vehicle 10 relative to the axis C5 of the pinion shaft 42, i.e., in a direction of an arrow F2 shown in FIG. 4 relative to the axis C5 of the pinion shaft 42, in the first lubricating oil passage A1. The tip portion P2, of the first guidance projection 38l is formed at a position shifted by the predetermined angle θ1 (degree) in the direction of the arrow F2 shown in FIG. 4 relative to the axis C5 of the pinion shaft 42 in the first lubricating oil passage A1.

Figure 6:
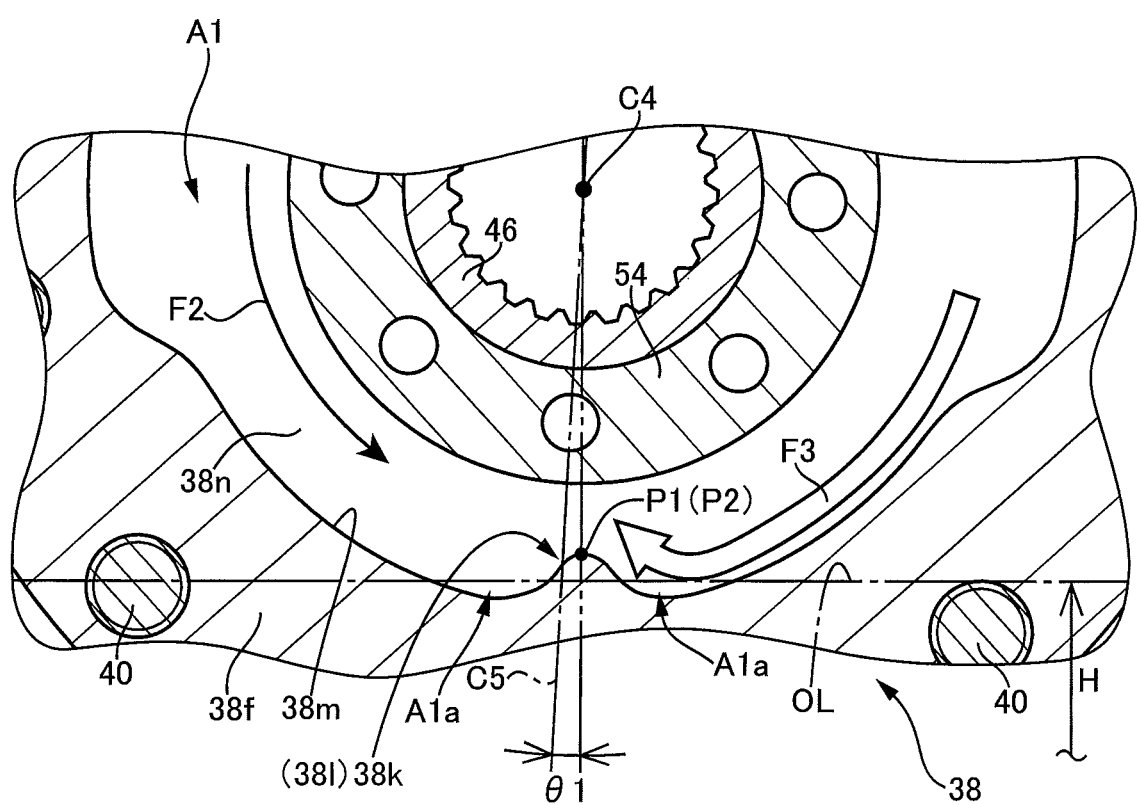
FIG. 6 is a view for explaining a flow of oil flowing through a first lubricating oil passage formed in the differential casing of FIG. 5.

The first guidance projection 38k configured as described above guides the oil LF flowing in the circumferential direction in the first lubricating oil passage A1 toward the first meshing portion G1 between the first side gear 46 and the pinion gear 50 due to the rotation of the differential casing 38 around the fourth rotational axis C4 at the time of forward running of the vehicle 10, i.e., due to the rotation of the differential casing 38 in the direction of the arrow F2. Specifically, as shown in FIG. 6, the differential casing 38, i.e., the first guidance projection 38k formed on the differential casing 38, rotates around the fourth rotational axis C4 in the direction of the arrow F2, and the oil LF flowing in the circumferential direction in the first lubricating oil passage A1 is pushed up by the first guidance projection 38k toward the fourth rotational axis C4 so that the pushed-up oil LF is guided toward the first meshing portion G1 between the first side gear 46 and the pinion gear 50. Additionally, the first guidance projection 38l configured as described above guides the oil LF flowing in the circumferential direction in the first lubricating oil passage A1 toward the second meshing portion G2 between the first side gear 46 and the pinion gear 52 due to the rotation of the differential casing 38 in the direction of the arrow F2. Specifically, as shown in FIG. 6, the first guidance projection 38l formed on the differential casing 38 rotates around the fourth rotational axis C4 in the direction of the arrow F2, and the oil LF flowing in the circumferential direction in the first lubricating oil passage A1 is pushed up by the first guidance projection 38l toward the fourth rotational axis C4 so that the pushed-up oil LF is guided toward the second meshing portion G2 between the first side gear 46 and the pinion gear 52. An arrow F3 shown in FIG. 6 indicates a flow of the oil LF flowing in the circumferential direction in the first lubricating oil passage A1.

Figure 7:
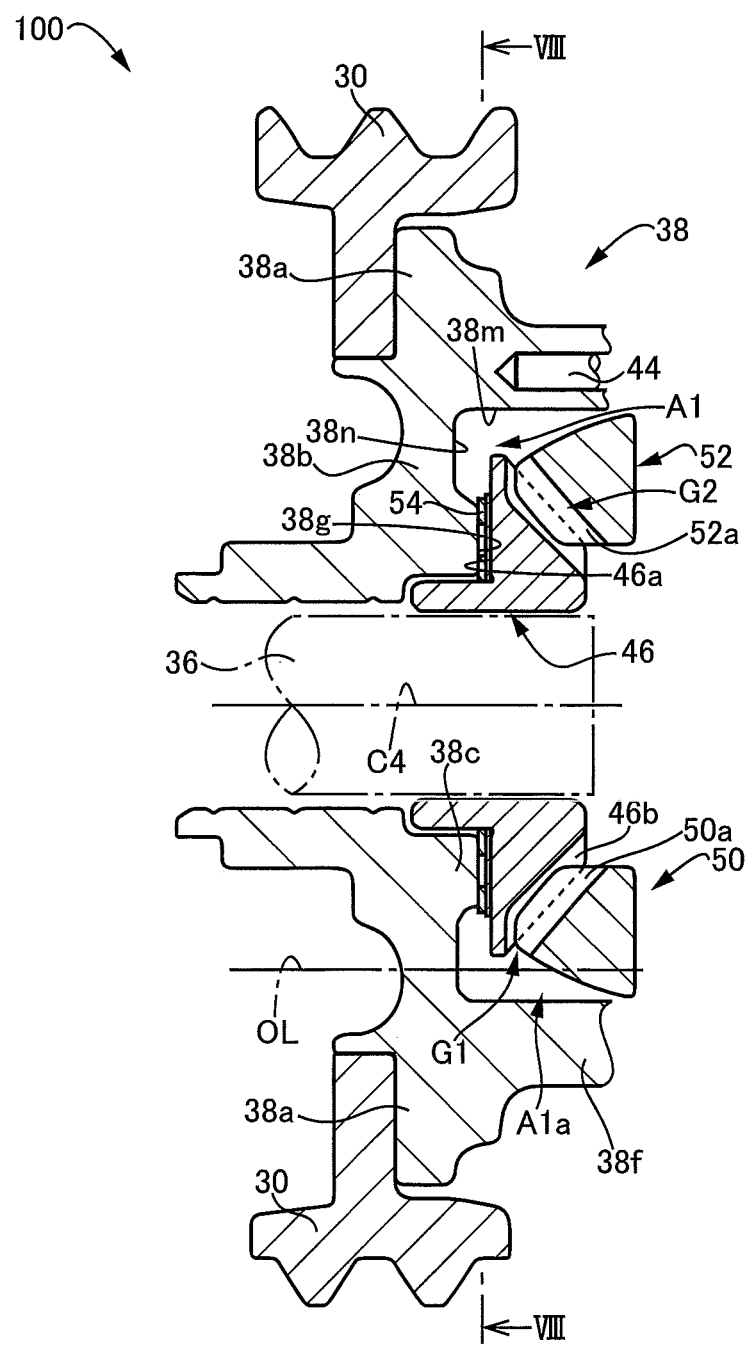
FIG. 7 is a cross-sectional view showing a differential device of a comparative example in which a pair of first guidance projections is not formed in the differential casing.
Figure 8:
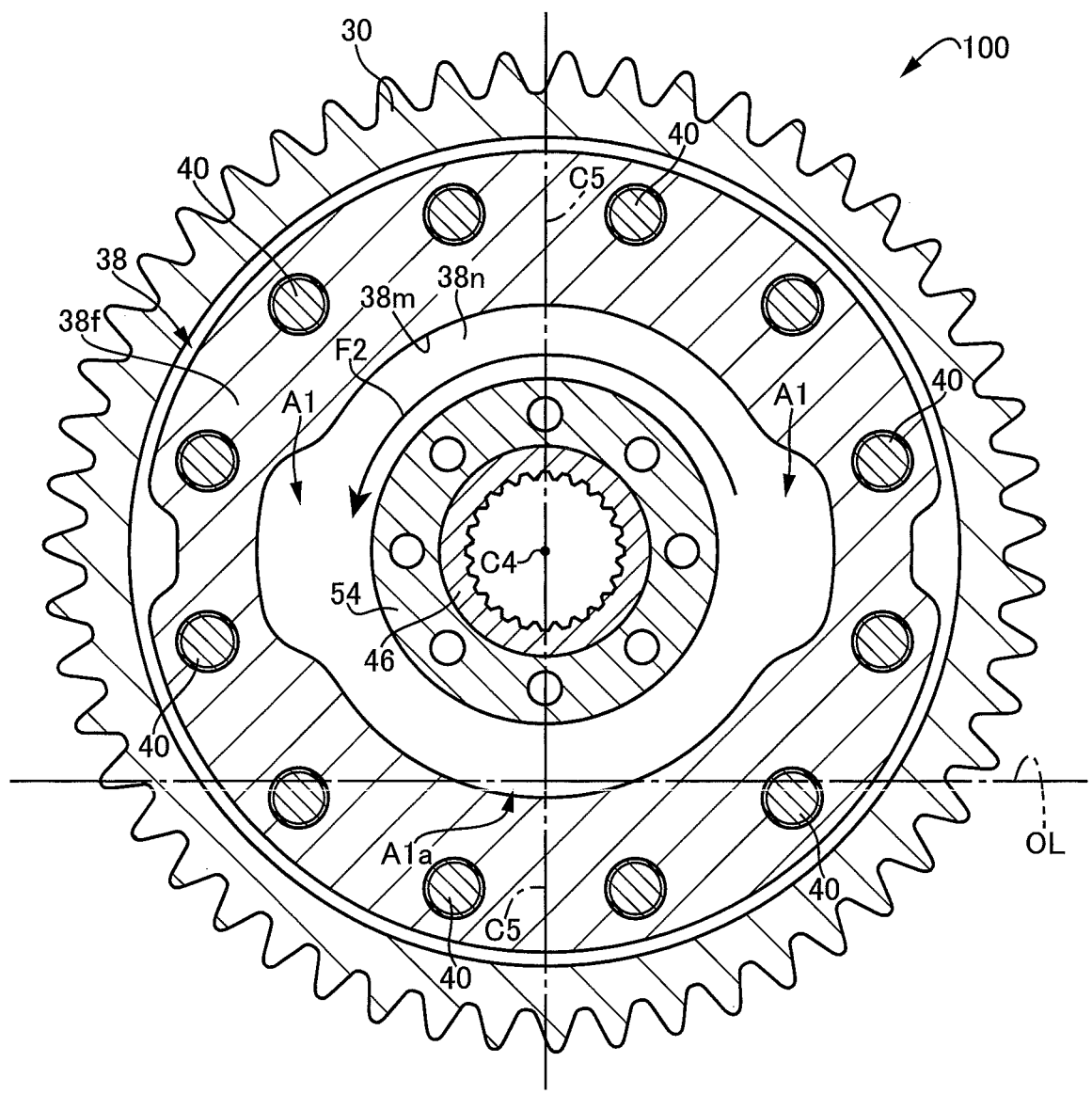
FIG. 8 is a cross-sectional view taken along a line VIII-VIII of FIG. 7.

FIGS. 7 and 8 are cross-sectional views for explaining a differential device 100 of a comparative example partially different in structure from the differential device 34 of this example. The differential device 100 of the comparative example is substantially the same as the differential device 34 of this example except that the pair of the first guidance projections 38k, 38l is not disposed on the differential casing 38. When the differential casing 38 rotates in the direction of the arrow F2 around the fourth rotational axis C4 in the differential device 100 of the comparative example, the oil LF flows in the circumferential direction in the first lubricating oil passage A1; however, since the pair of the first guidance projections 38k, 38l is not disposed, the oil LF remains flowing in the circumferential direction in the first lubricating oil passage A1 in the differential device 100. Therefore, the differential device 100 of the comparative example cannot suitably lubricate the first meshing portion G1 and the second meshing portion G2 with the oil LF, especially when an amount of the oil LF stored in the transaxle casing 18a is relatively small, as compared to the differential device 34 of this example.

As described above, according to the differential device 34 of this example, the differential casing 38 is provided with the groove-shaped first lubricating oil passage A1 formed in the circumferential direction to open inward on the outer circumferential side of the first bearing surface 38g, and the pair of the first guidance projections 38k, 38l both projected toward the fourth rotational axis C4 in the first lubricating oil passage A1 to guide the oil LF flowing in the circumferential direction in the first lubricating oil passage A1 due to the rotation of the differential casing 38 around the fourth rotational axis C4 toward the first meshing portion G1 and the second meshing portion G2, respectively. Therefore, the oil LF flowing in the circumferential direction in the first lubricating oil passage A1 due to the rotation of the differential casing 38 around the fourth rotational axis C4 is guided by the pair of the first guidance projections 38k, 38l respectively toward the first meshing portion G1 and the second meshing portion G2, and the first meshing portion G1 and the second meshing portion G2 are suitably lubricated by the guided oil LF, so that seizure is suitably suppressed in the first meshing portion G1 and the second meshing portion G2.

According to the differential device 34 of this example, the differential casing 38 includes the first wall portion 38b facing the back surface 46a of the first side gear 46 of the pair of the side gears 46, 48, and the paired first guidance projections 38k, 38l respectively project in the direction toward the first meshing portion G1 and in the direction toward the second meshing portion G2 from the bottom wall surface 38m of the first lubricating oil passage A1 and the side wall surface 38n of the first lubricating oil passage A1 on the first wall portion 38b side. Therefore, the oil LF flowing in the circumferential direction in the first lubricating oil passage A1 due to the rotation of the differential casing 38 around the fourth rotational axis C4 is suitably guided by the pair of the first guidance projections 38k, 38l to the first meshing portion G1 and the second meshing portion G2.

According to the differential device 34 of this example, the tip portions of the first guidance projections 38k, 38l project toward the fourth rotational axis C4 further than the circular loci L1, L2 along which the positions B1, B2 on the outermost circumferential side and closest to the first side gear 46 in the fourth rotational axis C4 direction of the tooth bottoms of the pinion gears 50, 52 are rotated around the fourth rotational axis C4. Therefore, the oil LF flowing in the circumferential direction in the first lubricating oil passage A1 due to the rotation of the differential casing 38 around the fourth rotational axis C4 is suitably guided by the pair of the first guidance projections 38k, 38l to the first meshing portion G1 and the second meshing portion G2.

According to the differential device 34 of this example, the differential casing 38 includes the pinion shaft 42 rotatably supporting the pair of the pinion gears 50, 52, and the tip portions P1, P2 of the first guidance projections 38k, 38l are formed at positions shifted in the direction of rotation of the differential casing 38 at the time of forward running of the vehicle 10 relative to the axis C5 of the pinion shaft 42. Therefore, the oil LF flowing in the circumferential direction in the first lubricating oil passage A1 due to the rotation of the differential casing 38 around the fourth rotational axis C4 in the direction of the arrow F2 is guided by the first guidance projection 38k to the side of the direction of rotation of the differential casing 38 at the time of forward running of the vehicle 10 relative to the first meshing portion G1 and is guided by the first guidance projection 38l to the side of the direction of rotation of the differential casing 38 at the time of forward running of the vehicle 10 relative to the second meshing portion G2, so that the first meshing portion G1 and the second meshing portion G2 can suitably be lubricated.

According to the differential device 34 of this example, the paired first guidance projections 38k, 38l are both disposed on the axis C5 of the pinion shaft 42. Therefore, the first meshing portion G1 of meshing between the pinion gear 50 and the first side gear 46 and the second meshing portion G2 of meshing between the pinion gear 52 and the first side gear 46 can suitably be lubricated.

Other examples of the present invention will be described with reference to the drawings. In the following description, portions common to the examples are denoted by the same reference numerals and will not be described.

Second Example

Figure 9:
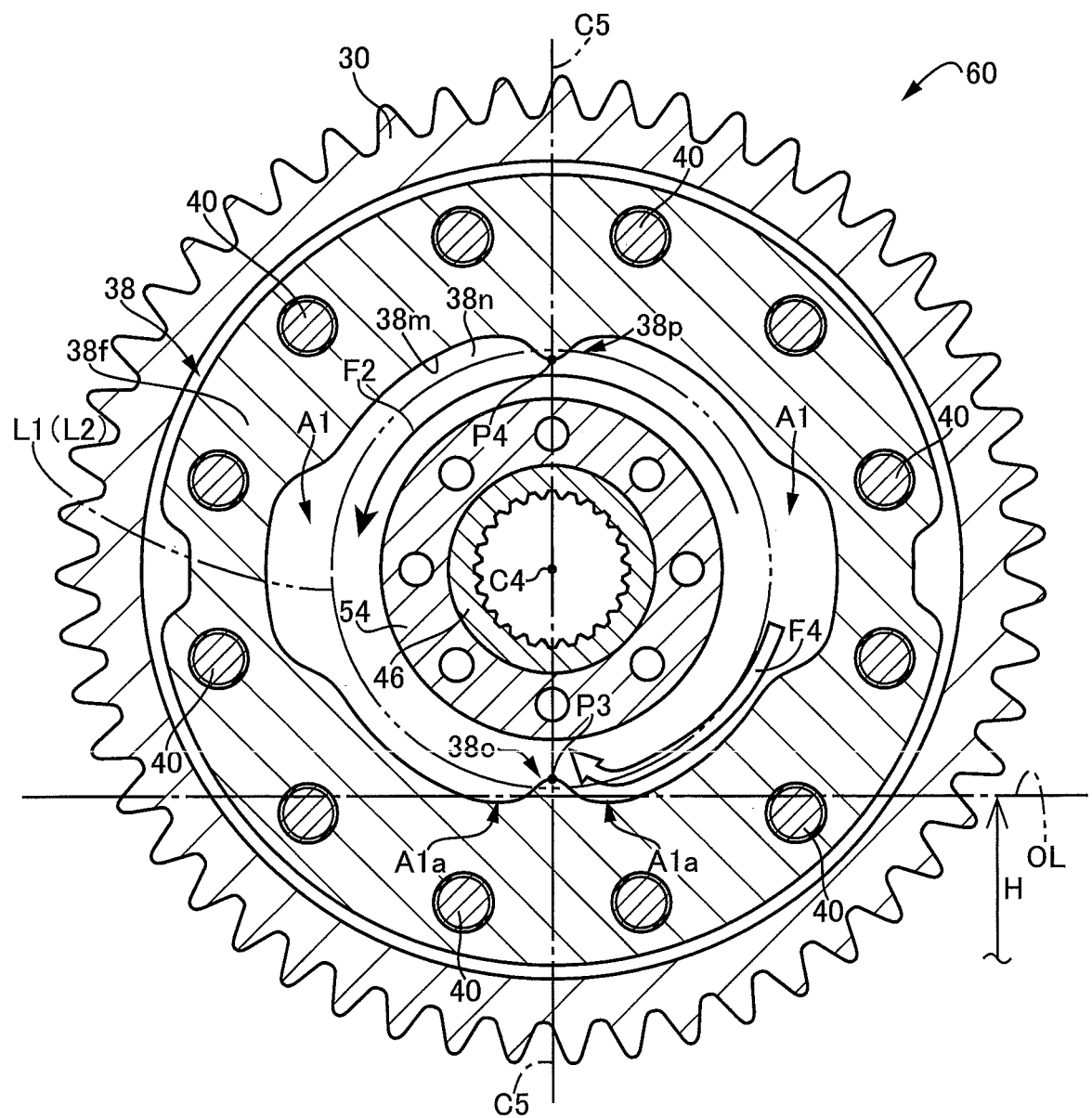
FIG. 9 is a view showing a differential device of another example (second example) of this invention.

As shown in FIG. 9, a differential device (vehicle differential device) 60 of this example is substantially the same as the differential device 34 of the first example described above except that tip portions P3, P4 of a pair of first guidance projections 38o, 38p are both disposed on the axis C5 of the pinion shaft 42. The shapes of the first guidance projections 38o, 38p of this example are the same as the shapes of the first guidance projections 38k, 38l of the first example described above.

In the differential device 60 of this example, as shown in FIG. 9, since the first guidance projection 38o rotates around the fourth rotational axis C4 in the direction of the arrow F2, and the oil LF flowing in the circumferential direction in the first lubricating oil passage A1 is pushed up by the first guidance projection 38o toward the fourth rotational axis C4 so that the pushed-up oil LF is guided toward the first meshing portion G1, the first meshing portion G1 is suitably lubricated by the oil LF, and seizure is suitably suppressed in the first meshing portion G1. Specifically, as with the first guidance projection 38k of the first example described above, the first guidance projection 38o guides the oil LF in the first lubricating oil passage A1 toward the first meshing portion G1 due to the rotation of the differential casing 38 around the fourth rotational axis C4 in the direction of the arrow F2. An arrow F4 shown in FIG. 9 indicates the flow of the oil LF flowing in the circumferential direction in the first lubricating oil passage A1.

Additionally, in the differential device 60 of this example, since the first guidance projection 38p rotates around the fourth rotational axis C4 in the direction of the arrow F2, and the oil LF flowing in the circumferential direction in the first lubricating oil passage A1 is pushed up by the first guidance projection 38p toward the fourth rotational axis C4 so that the pushed-up oil LF is guided toward the second meshing portion G2, the second meshing portion G2 is suitably lubricated by the oil LF, and seizure is suitably suppressed in the second meshing portion G2. Specifically, as with the first guidance projection 38l of the first example described above, the first guidance projection 38p guides the oil LF in the first lubricating oil passage A1 toward the second meshing portion G2 due to the rotation of the differential casing 38 around the fourth rotational axis C4 in the direction of the arrow F2.

Third Example

Figure 10:
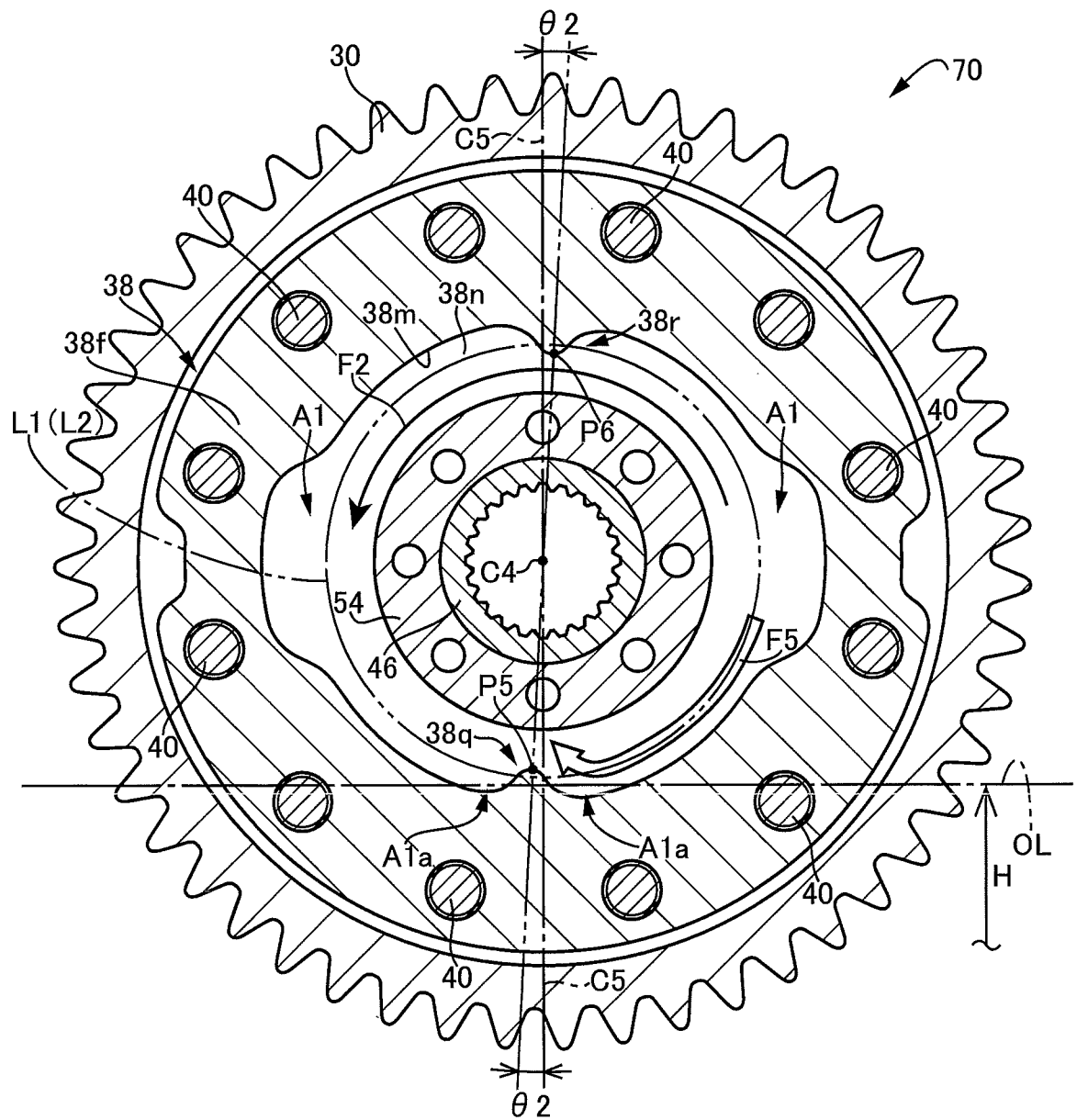
FIG. 10 is a view showing a differential device of still another example (third example) of this invention.

As shown in FIG. 10, a differential device (vehicle differential device) 70 of this example is substantially the same as the differential device 34 of the first example described above except that tip portions P5, p6 of a pair of first guidance projections 38q, 38r are formed at positions shifted by a predetermined angle θ2 (degree) in the direction opposite to the direction of rotation of the differential casing 38 at the time of forward running of the vehicle 10 relative to the axis C5 of the pinion shaft 42 in the first lubricating oil passage A1. The shapes of the first guidance projections 38q, 38r of this example are the same as the shapes of the first guidance projections 38k, 38l of the first example described above.

In the differential device 70 of this example, as shown in FIG. 10, since the first guidance projection 38q rotates around the fourth rotational axis C4 in the direction of the arrow F2, and the oil LF flowing in the circumferential direction in the first lubricating oil passage A1 is pushed up by the first guidance projection 38q toward the fourth rotational axis C4 so that the pushed-up oil LF is guided toward the first meshing portion G1, the first meshing portion G1 is suitably lubricated by the oil LF, and seizure is suitably suppressed in the first meshing portion G1. Specifically, as with the first guidance projection 38k of the first example described above, the first guidance projection 38q guides the oil LF in the first lubricating oil passage A1 toward the first meshing portion G1 due to the rotation of the differential casing 38 around the fourth rotational axis C4 in the direction of the arrow F2. An arrow F5 shown in FIG. 10 indicates the flow of the oil LF flowing in the circumferential direction in the first lubricating oil passage A1.

Additionally, in the differential device 70 of this example, since the first guidance projection 38r rotates around the fourth rotational axis C4 in the direction of the arrow F2, and the oil LF flowing in the circumferential direction in the first lubricating oil passage A1 is pushed up by the first guidance projection 38r toward the fourth rotational axis C4 so that the pushed-up oil LF is guided toward the second meshing portion G2, the second meshing portion G2 is suitably lubricated by the oil LF, and seizure is suitably suppressed in the second meshing portion G2. Specifically, as with the first guidance projection 38l of the first example described above, the first guidance projection 38r guides the oil LF in the first lubricating oil passage A1 toward the second meshing portion G2 due to the rotation of the differential casing 38 around the fourth rotational axis C4 in the direction of the arrow F2.

Fourth Example

Figure 11:
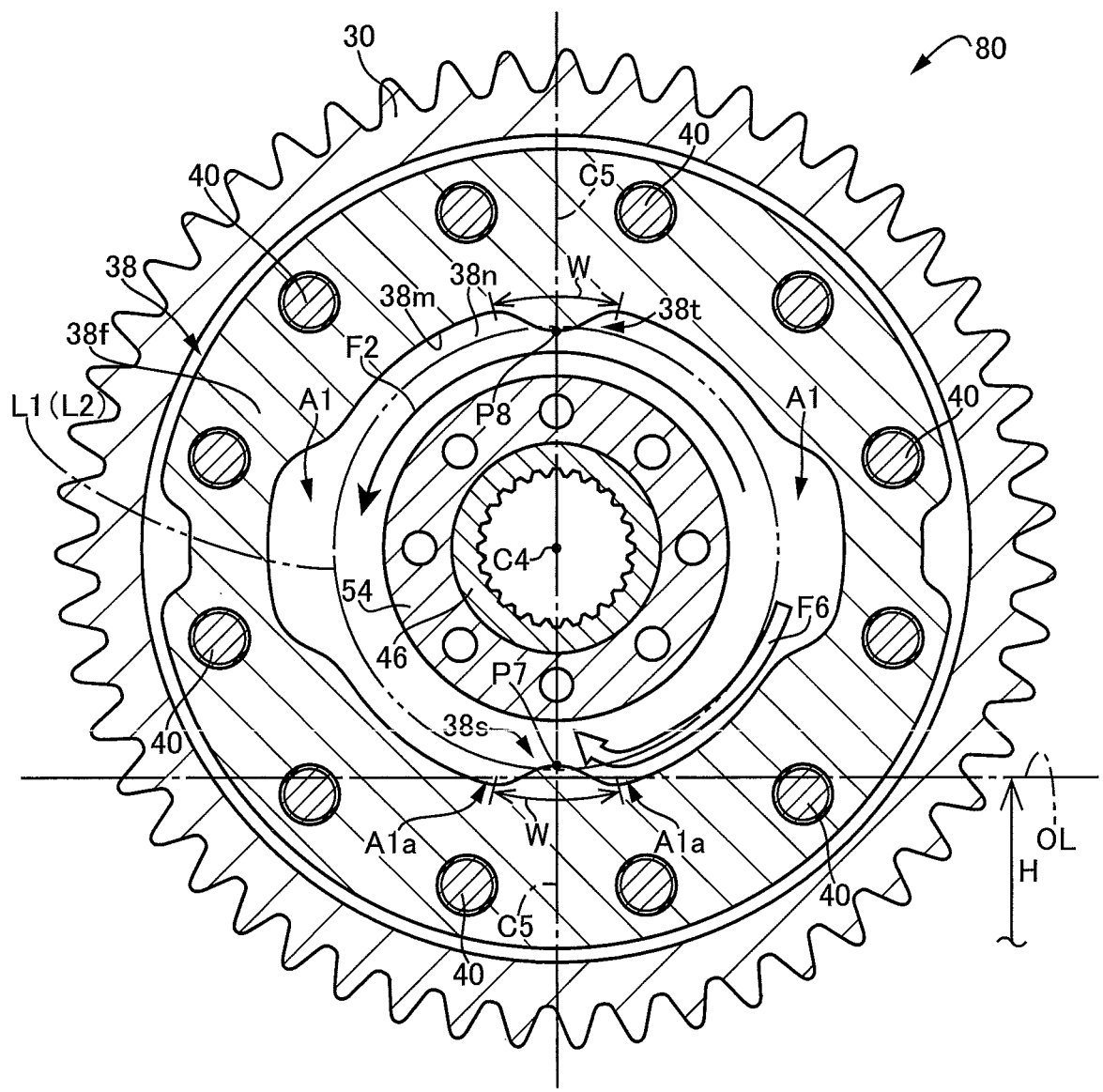
FIG. 11 is a view showing a differential device of still another example (fourth example) of this invention.

As shown in FIG. 11, a differential device (vehicle differential device) 80 of this example is substantially the same as the differential device 34 of the first example described above except that shapes of a pair of first guidance projections 38s, 38t of the differential device 80 are different from that of the first guidance projections 38k, 38l of the differential device 34.

As shown in FIG. 11, the first guidance projection 38s has a width dimension W in the circumferential direction of the differential casing 38 made larger than the width dimension of the first guidance projection 38k of the first example described above and, as with the first guidance projection 38k of the first example described above, the first guidance projection 38s projects in a direction toward the first meshing portion G1 from the bottom wall surface 38m forming the first lubricating oil passage A1 and the side wall surface 38n forming the first lubricating oil passage A1. As shown in FIG. 11, a tip portion P7, of the first guidance projection 38s projects toward the fourth rotational axis C4 further than the circular locus L1.

As shown in FIG. 11, the first guidance projection 38t has width dimension W in the circumferential direction of the differential casing 38 made larger than the width dimension of the first guidance projection 38l of the first example described above and, as with the first guidance projection 38l of the first example described above, the first guidance projection 38t projects in a direction toward the second meshing portion G2 from the bottom wall surface 38m and the side wall surface 38n. As shown in FIG. 11, a tip portion P8, of the first guidance projection 38t projects toward the fourth rotational axis C4 further than the circular locus L2. As shown in FIG. 11, the tip portions P7, P8 of the pair of the first guidance projections 38s, 38t formed on the differential casing 38 are both disposed on the axis C5 of the pinion shaft 42, and the paired first guidance projections 38s, 38t are symmetric to each other about the fourth rotational axis C4.

As shown in FIG. 11, since the first guidance projection 38s configured as described above is rotated around the fourth rotational axis C4 in the direction of the arrow F2, and the oil LF flowing in the circumferential direction in the first lubricating oil passage A1 is pushed up by the first guidance projection 38s toward the fourth rotational axis C4 so that the pushed-up oil LF is guided toward the first meshing portion G1, the first meshing portion G1 is suitably lubricated by the oil LF, and seizure is suitably suppressed in the first meshing portion G1. Specifically, as with the first guidance projection 38k of the first example described above, the first guidance projection 38s guides the oil LF in the first lubricating oil passage A1 toward the first meshing portion G1 due to the rotation of the differential casing 38 around the fourth rotational axis C4 in the direction of the arrow F2. An arrow F6 shown in FIG. 11 indicates the flow of the oil LF flowing in the circumferential direction in the first lubricating oil passage A1.

Since the first guidance projection 38t configured as described above is rotated around the fourth rotational axis C4 in the direction of the arrow F2, and the oil LF flowing in the circumferential direction in the first lubricating oil passage A1 is pushed up by the first guidance projection 38t toward the fourth rotational axis C4 so that the pushed-up oil LF is guided toward the second meshing portion G2, the second meshing portion G2 is suitably lubricated by the oil LF, and seizure is suitably suppressed in the second meshing portion G2. Specifically, as with the first guidance projection 38l of the first example described above, the first guidance projection 38t guides the oil LF in the first lubricating oil passage A1 toward the second meshing portion G2 due to the rotation of the differential casing 38 around the fourth rotational axis C4 in the direction of the arrow F2.

Fifth Example

Figure 12:
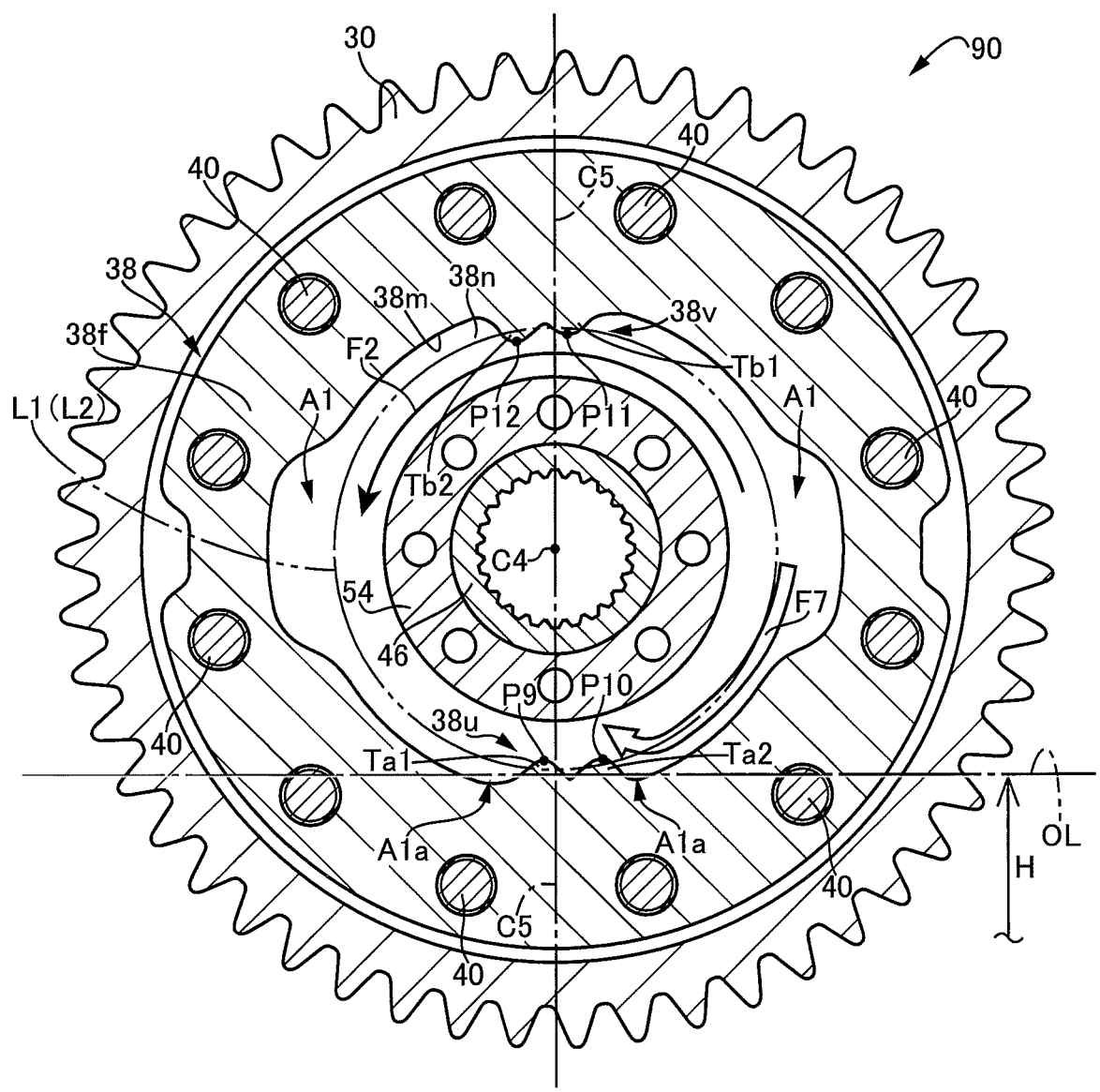
FIG. 12 is a view showing a differential device of still another example (fifth example) of this invention.

As shown in FIG. 12, a differential device (vehicle differential device) 90 of this example is substantially the same as the differential device 34 of the first example described above except that shapes of a pair of first guidance projections 38u, 38v are different from that of the first guidance projections 38k, 38l of the differential device 34.

As shown in FIG. 12, the first guidance projection 38u includes a pair of a first projecting portion Ta1 and a second projecting portion Ta2 respectively projecting in the direction toward the first meshing portion G1 from the bottom wall surface 38m and the side wall surface 38n forming the first lubricating oil passage A1. A tip portion P9 of the first projecting portion Ta1 and a tip portion P10 of the second projecting portion Ta2 both project toward the fourth rotational axis C4 further than (i.e. to across) the circular locus L1.

As shown in FIG. 12, the first guidance projection 38v includes a pair of a first projecting portion Tb1 and a second projecting portion Tb2 respectively projecting in the direction toward the second meshing portion G2 from the bottom wall surface 38m and the side wall surface 38n forming the first lubricating oil passage A1. A tip portion P11 of the first projecting portion Tb1 and a tip portion P12 of the second projecting portion Tb2 both project toward the fourth rotational axis C4 further than the circular locus L2. As shown in FIG. 12, the paired first guidance projections 38u, 38v are symmetric to each other about the fourth rotational axis C4 in the fourth rotational axis C4 direction, and the paired first guidance projections 38u, 38v are both disposed on the axis C5 of the pinion shaft 42.

As shown in FIG. 12, since the first guidance projection 38u configured as described above is rotated around the fourth rotational axis C4 in the direction of the arrow F2, and the oil LF flowing in the circumferential direction in the first lubricating oil passage A1 is pushed up by the first guidance projection 38u toward the fourth rotational axis C4 so that the pushed-up oil LF is guided toward the first meshing portion G1, the first meshing portion G1 is suitably lubricated by the oil LF, and seizure is suitably suppressed in the first meshing portion G1. Specifically, as with the first guidance projection 38k of the first example described above, the first guidance projection 38u guides the oil LF in the first lubricating oil passage A1 toward the first meshing portion G1 due to the rotation of the differential casing 38 around the fourth rotational axis C4 in the direction of the arrow F2. An arrow F7 shown in FIG. 12 indicates the flow of the oil LF flowing in the circumferential direction in the first lubricating oil passage A1.

Since the first guidance projection 38v configured as described above is rotated around the fourth rotational axis C4 in the direction of the arrow F2, and the oil LF flowing in the circumferential direction in the first lubricating oil passage A1 is pushed up by the first guidance projection 38v toward the fourth rotational axis C4 so that the pushed-up oil LF is guided toward the second meshing portion G2, the second meshing portion G2 is suitably lubricated by the oil LF, and seizure is suitably suppressed in the second meshing portion G2. Specifically, as with the first guidance projection 38*l* of the first example described above, the first guidance projection 38*v* guides the oil LF in the first lubricating oil passage A1 toward the second meshing portion G2 due to the rotation of the differential casing 38 around the fourth rotational axis C4 in the direction of the arrow F2.

Sixth Example

Figure 13:
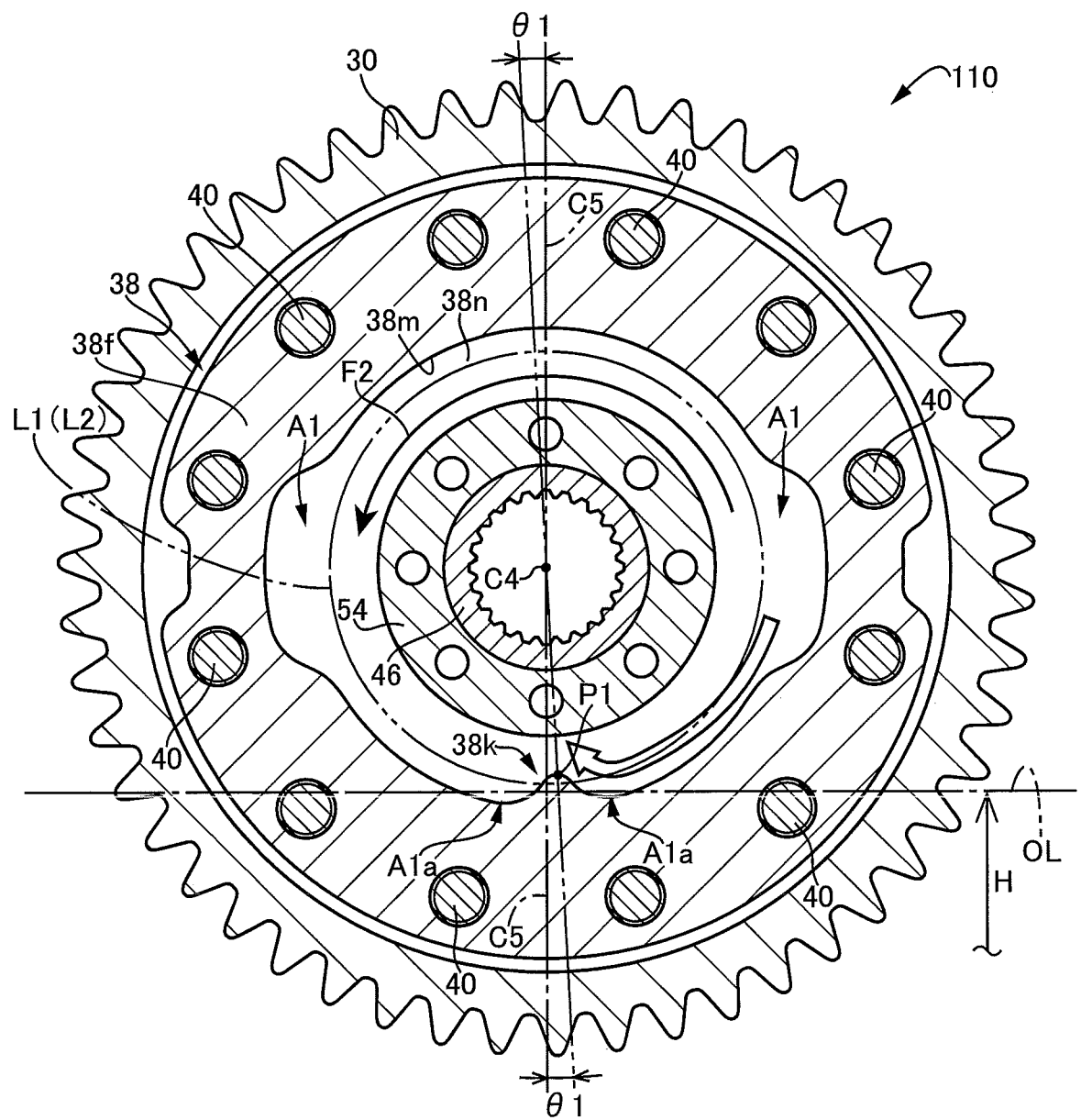
FIG. 13 is a view showing a differential device of still another example (sixth example) of this invention.

As shown in FIG. 13, a differential device (vehicle differential device) 110 of this example is substantially the same as the differential device 34 of the first example described above except that one of the first guidance projections 38*k*, 38*l* i.e. the first guidance projection 38*k* is formed on the differential casing 38 in the differential device 100.

Seventh Example

Figure 14:
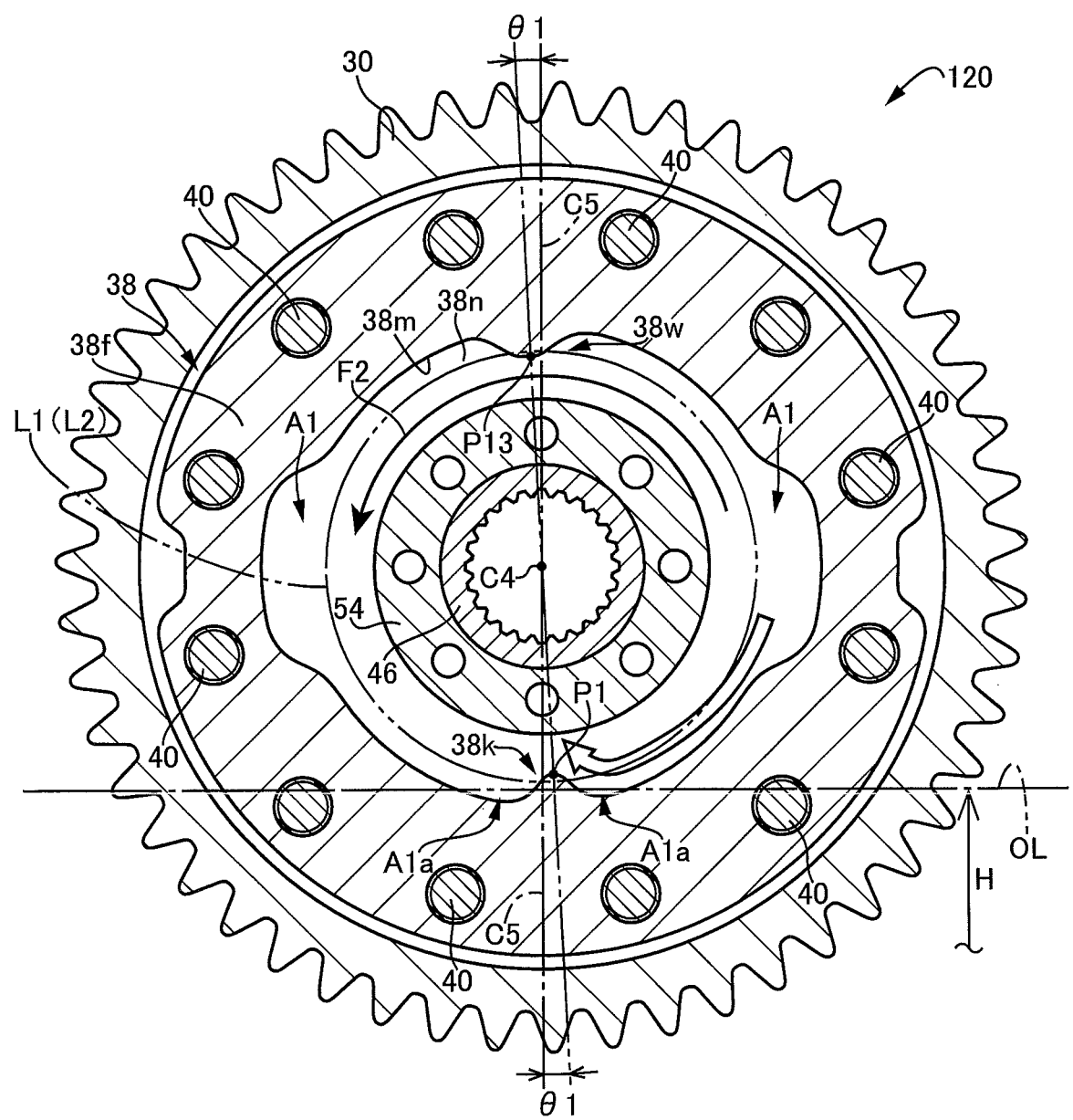
FIG. 14 is a view showing a differential device of still another example (seventh example) of this invention.

As shown in FIG. 14, a differential device (vehicle differential device) 120 of this example is substantially the same as the differential device 34 of the first example described above except that a pair of first guidance projections 38*k*, 38*w* is asymmetric about the fourth rotational axis C4. The shape of the first guidance projection 38*w* is the same as the shape of the first guidance projection 38*t* of the fourth example described above, and a tip portion P13 of the first guidance projection 38*w* is formed at a position shifted by the predetermined angle θ1 (degree) in the direction of rotation of the differential casing 38 at the time of forward running of the vehicle 10 relative to the axis C5 of the pinion shaft 42, i.e., in the direction of the arrow F2 relative to the axis C5 of the pinion shaft 42, in the first lubricating oil passage A1.

Although the examples of the present invention have been described in detail with reference to the drawings, the present invention is also applied in other forms.

For example, although the differential device 34 of the first example described above has the differential casing 38 provided with the pair of the first guidance projections 38*k*, 38*l*, the differential casing 38 may further be provided with a pair of second guidance projections 38*x*, 38*y*, wherein one 38*x* of the second guidance projections 38*x*, 38*y* guides the oil LF flowing in the second lubricating oil passage A2 due to the rotation of the differential casing 38 around the fourth rotational axis C4 toward the third meshing portion G3 between the second side gear 48 and the pinion gear 50, and the other 38*y* of the second guidance projections 38*x*, 38*y* guides the oil LF flowing in the second lubricating oil passage A2 toward the fourth meshing portion G4 between the second side gear 48 and the pinion gear 52. The pair of the second guide projections 38*x*, 38*y* of the example described above may be formed on the differential casing 38 included in the differential devices 60, 70, 80, 90, 110, 120 of the examples described above. As a result, the oil LF flowing in the circumferential direction in the second lubricating oil passage A2 is guided by the pair of the second guidance projections 38*x*, 38*y* respectively toward the third meshing portion G3 and the fourth meshing portion G4, so that the third meshing portion G3 and the fourth meshing portion G4 are respectively suitably lubricated.

Although the differential devices 34, 60, 70, 80, 90, 110, 120 of the examples described above include the pinion shaft 42 rotatably supporting the pair of the pinion gears 50, 52, for example, the differential casing 38 may be provided with a pinion gear supporting portion rotatably supporting the pinion gears 50, 52, and the pinion shaft 42 may be removed. Therefore, the differential devices 34, 60, 70, 80, 90, 110, 120 of the examples described above may be shaftless differential devices in which the pinion shaft 42 is not included in the differential casing 38.

In the examples described above, the differential casing 38 includes the first projecting portion 38*c* projecting from the first wall portion 38*b* in an annular shape in the direction toward the back surface 46*a* of the first side gear 46, and the first bearing surface 38*g* is formed on the first projecting portion 38*c*. For example, the first projecting portion 38*c* may not be formed in the differential casing 38, and the first bearing surface 38*g* may be formed on a portion of the side wall surface 38*n* formed on the first wall portion 38*b* of the differential casing 38. If the first projecting portion 38*c* is not included in the differential casing 38, the first side gear 46 is provided with a boss portion projecting from the first side gear 46 in an annular shape in a direction toward the first bearing surface 38*g*. In such a case, the first lubricating oil passage A1 is formed in the circumferential direction on the outer circumferential side of the first bearing surface 38*g* to surround the boss portion of the first side gear 46. Similarly, although the second lubricating oil passage A2 is also formed into a circumferential groove shape opening inward on the outer circumferential side of the second bearing surface 38*h*, if the second projecting portion 38*e* is not formed on the differential casing 38 and a boss portion similar to that provided in the first side gear 46 is formed on the second side gear 48, the second lubricating oil passage A2 is formed in the circumferential direction on the outer circumferential side of the second bearing surface 38*h* to surround the boss portion of the second side gear 48.

Although the tip portions P1, P2 of the first guidance projections 38*k*, 38*l* are formed at positions shifted in the direction of rotation of the differential casing 38 at the time of forward running of the vehicle 10 relative to the axis C5 of the pinion shaft 42 in the examples described above, for example, the tip portions P1, P2 of the first guidance projections 38*k*, 38*l* may be fruited at positions shifted in the direction of rotation of the differential casing 38 at the time of reverse running of the vehicle 10 relative to the axis C5 of the pinion shaft 42.

The above description is merely an embodiment and the present invention can be implemented in variously modified and improved forms based on the knowledge of those skilled in the art.

REFERENCE SIGNS LIST

34; 60; 70; 80; 90; 110; 120: differential device (vehicle differential device)
38: differential casing
38*b*: first wall portion (wall portion)
38*g*: first bearing surface (bearing surface)
38*h*: second bearing surface (bearing surface)
38*k*, 38*l*; 38*o*, 38*p*; 38*q*, 38*r*; 38*s*, 38*t*; 38*u*, 38*v*; 38*k*; 38*k*, 38*w*: first guidance projection
38*m*: bottom wall surface
38*n*: side wall surface
42: pinion shaft
46: first side gear
46*a*: back surface
48: second side gear
50, 52: pinion shaft
A1: first lubricating oil passage
A2: second lubricating oil passage B1, B2: position
C4: fourth rotational axis (rotational axis)
C5: axis of the pinion shaft
G1: first meshing portion (meshing portion)
G2: second meshing portion (meshing portion)
L1, L2: circular locus
LF: oil (lubricating oil)

What is claimed is:

1. A vehicle differential device comprising:
a differential casing rotatably disposed around a rotational axis; and
a pair of side gears rotatably supported by the differential casing and supported in a thrust direction via an annular bearing surface formed in the differential casing to mesh with a pair of pinion gears, wherein:
the differential casing is provided with a first lubricating oil passage formed in a circumferential direction on an outer circumferential side of the bearing surface in the differential casing, and a first guidance projection projected toward the rotational axis in the first lubricating oil passage and guiding a lubricating oil flowing in a circumferential direction in the first lubricating oil passage due to rotation of the differential casing around the rotational axis, toward a first meshing portion between a first side gear of the pair of side gears and the pinion gears,
the differential casing includes a wall portion facing a back surface of the first side gear, and
the first guidance projection projects from a bottom wall surface in the first lubricating oil passage and a side wall surface on the wall portion side in a direction toward the first meshing portion between the first side gear and the pinion gears.

2. The vehicle differential device according to claim 1, wherein the differential casing is provided with a second lubricating oil passage formed in the same manner as the first lubricating oil passage on the side opposite to the first lubricating oil passage with respect to the pair of pinion gears, and a second guidance projection guiding a lubricating oil flowing in the second lubricating oil passage due to rotation of the differential casing around the rotational axis toward a second meshing portion between a second side gear of the pair of side gears and the pinion gears.

3. A vehicle differential device comprising:
a differential casing rotatably disposed around a rotational axis; and
a pair of side gears rotatably supported by the differential casing and supported in a thrust direction via an annular bearing surface formed in the differential casing to mesh with a pair of pinion gears, wherein:
the differential casing is provided with a first lubricating oil passage formed in a circumferential direction on an outer circumferential side of the bearing surface in the differential casing, and a first guidance projection projected toward the rotational axis in the first lubricating oil passage and guiding a lubricating oil flowing in a circumferential direction in the first lubricating oil passage due to rotation of the differential casing around the rotational axis, toward a first meshing portion between a first side gear of the pair of side gears and the pinion gears, and
a tip portion of the first guidance projection projects toward the rotational axis further than a circular locus along which a position on an outermost circumferential side and closest to the first side gear of a tooth bottom of the pinion gear is rotated around the rotational axis.

4. The vehicle differential device according to claim 3, wherein the differential casing is provided with a second lubricating oil passage formed in the same manner as the first lubricating oil passage on the side opposite to the first lubricating oil passage with respect to the pair of pinion gears, and a second guidance projection guiding a lubricating oil flowing in the second lubricating oil passage due to rotation of the differential casing around the rotational axis toward a second meshing portion between a second side gear of the pair of side gears and the pinion gears.

5. A vehicle differential device comprising:
a differential casing rotatably disposed around a rotational axis; and
a pair of side gears rotatably supported by the differential casing and supported in a thrust direction via an annular bearing surface formed in the differential casing to mesh with a pair of pinion gears, wherein:
the differential casing is provided with a first lubricating oil passage formed in a circumferential direction on an outer circumferential side of the bearing surface in the differential casing, and a first guidance projection projected toward the rotational axis in the first lubricating oil passage and guiding a lubricating oil flowing in a circumferential direction in the first lubricating oil passage due to rotation of the differential casing around the rotational axis, toward a first meshing portion between a first side gear of the pair of side gears and the pinion gears,
the differential casing includes a pinion shaft rotatably supporting the pair of pinion gears, and
a tip portion of the first guidance projection is formed at a position shifted from an axis of the pinion shaft in the first lubricating oil passage.

6. The vehicle differential device according to claim 5, wherein the first guidance projection includes a pair of projections disposed on the axis of the pinion shaft.

7. The vehicle differential device according to claim 5, wherein the differential casing is provided with a second lubricating oil passage formed in the same manner as the first lubricating oil passage on the side opposite to the first lubricating oil passage with respect to the pair of pinion gears, and a second guidance projection guiding a lubricating oil flowing in the second lubricating oil passage due to rotation of the differential casing around the rotational axis toward a second meshing portion between a second side gear of the pair of side gears and the pinion gears.

* * * * *